US012162372B2

(12) United States Patent
Ahtikari

(10) Patent No.: US 12,162,372 B2
(45) Date of Patent: Dec. 10, 2024

(54) ELECTRIC VEHICLE CHARGING STATION RELIABILITY ASSESSMENT METHOD AND DEVICE

(71) Applicant: LIIKENNEVIRTA OY / VIRTA LTD, Helsinki (FI)

(72) Inventor: Jussi Ahtikari, Helsinki (FI)

(73) Assignee: Liikennevirta Oy / Virta LTD, Helsinki (FI)

( * ) Notice: Subject to any disclaimer, the term of this patent is extended or adjusted under 35 U.S.C. 154(b) by 443 days.

(21) Appl. No.: 17/619,122

(22) PCT Filed: Nov. 3, 2020

(86) PCT No.: PCT/FI2020/050718
§ 371 (c)(1),
(2) Date: Dec. 14, 2021

(87) PCT Pub. No.: WO2021/089914
PCT Pub. Date: May 14, 2021

(65) Prior Publication Data
US 2022/0355696 A1 Nov. 10, 2022

(30) Foreign Application Priority Data
Nov. 4, 2019 (FI) ...................................... 20195944

(51) Int. Cl.
*G06F 11/30* (2006.01)
*B60L 53/67* (2019.01)
*B60L 53/68* (2019.01)

(52) U.S. Cl.
CPC .............. *B60L 53/67* (2019.02); *B60L 53/68* (2019.02)

(58) Field of Classification Search
CPC ....................................................... B60L 53/67
See application file for complete search history.

(56) References Cited

U.S. PATENT DOCUMENTS

| | | | |
|---|---|---|---|
| 2017/0046762 A1* | 2/2017 | Arita | ................. G06Q 30/0639 |
| 2018/0086221 A1 | 3/2018 | Bouard et al. | |
| 2018/0152031 A1 | 5/2018 | Zhai et al. | |

FOREIGN PATENT DOCUMENTS

| | | |
|---|---|---|
| CN | 104933522 A | 9/2015 |
| CN | 205864033 U | 1/2017 |
| CN | 106671816 A | 5/2017 |
| CN | 107225994 A | 10/2017 |
| CN | 109501630 A | 3/2019 |

(Continued)

OTHER PUBLICATIONS

PCT Chapter II for PCT/FI2020/050718.*

(Continued)

*Primary Examiner* — Phuong Huynh
(74) *Attorney, Agent, or Firm* — Alston & Bird LLP

(57) ABSTRACT

It is an object to provide a charging station reliability assessment device and a charging station reliability assessment method. According to an embodiment, a method comprises obtaining a history information of an electric vehicle, EV, charging station. A first and a second reliability index may be calculated based on the history information. Based on the first and the second reliability index, a third reliability index may be calculated. A method, a device, and a computer program product are provided.

17 Claims, 3 Drawing Sheets

(56) References Cited

FOREIGN PATENT DOCUMENTS

| CN | 110135002 A | 8/2019 |
|---|---|---|
| CN | 110210777 A | 9/2019 |
| CN | 110276135 A | 9/2019 |
| EP | 2587338 A2 | 5/2013 |
| EP | 3130504 A1 | 2/2017 |
| WO | WO-2017-096225 A2 | 6/2017 |
| WO | WO-2019/020632 A1 | 1/2019 |

OTHER PUBLICATIONS

International Search Report and Written Opinion for PCT/FI2020/050718 (ISA/EP) mailed Feb. 5, 2021 (10 pages).
Finnish Search Report for FI Application No. 20195944 dated Feb. 21, 2020 (3 pages).
Office Action received for Chinese Patent Application No. 202080052286.1, mailed on May 29, 2024, 21 pages (English Translation only).

* cited by examiner

ELECTRIC VEHICLE CHARGING STATION RELIABILITY ASSESSMENT METHOD AND DEVICE

CROSS-REFERENCE TO RELATED APPLICATIONS

The present application is a national phase entry of International Application No. PCT/FI2020/050718, filed Nov. 3, 2020, which claims priority to Finnish Application No. 20195944, filed Nov. 4, 2019, which are incorporated herein by reference in their entirety.

TECHNICAL FIELD

The present disclosure relates to electric vehicle charging, and more particularly to an electric vehicle charging station reliability assessment method and device.

BACKGROUND

Various types of issues may arise with electric vehicle (EV) charging stations. Sometimes stations may be offline, sometimes stations transmit various error codes, sometimes, without a clear indication of the underlying cause, charging stations may malfunction. From the perspective of customers wishing to charge their EVs this is problematic: they never know if the EV charging station they are going to use is functioning or not. Especially if a customer is traveling long distances, they need reliable information on the condition of the charging station they are planning to use.

In more challenging situations, the EV charging station may be online and communicating with the administrative backend system. The EV charging station may not even send any error messages to the backend system. It is however quite common that the EV charging station still does not operate properly, even when these types of indicators do not show any signs of issues. Assessing the reliability of an EV charging station may therefore be challenging.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object to provide a charging station reliability assessment device and a charging station reliability assessment method. The foregoing and other objects are achieved by the features of the independent claims. Further implementation forms are apparent from the dependent claims, the description and the figures.

According to a first aspect a method comprises obtaining a history information of an electric vehicle, EV, charging station; calculating a first reliability index based on the history information, wherein the first reliability index corresponds to reliability of the EV charging station during a first time period; calculating a second reliability index based on the history information, wherein the second reliability index corresponds to reliability of the EV charging station during a second time period; and calculating a third reliability index based on the first reliability index and the second reliability index. The method may enable, for example, reliability assessment of the EV charging station.

In an implementation form of the first aspect, a length of the first time period is shorter than a length of the second time period. The method may enable, for example, reliability assessment of the EV charging station by assessing short term reliability of the EV charging station using the first reliability index and by assessing long term reliability of the EV charging station using the second reliability index. These can then be combined into the third reliability index in order to assess total reliability of the EV charging station.

In a further implementation form of the first aspect, the first time period corresponds to a time period between a current time and a first time threshold. The method may enable, for example, reliability assessment of the EV charging station during recent history by using the first reliability index.

In a further implementation form of the first aspect, the second time period corresponds to a time period between the first time threshold and a second time threshold. The method may enable, for example, reliability assessment of the EV charging station during less recent history by using the second reliability index.

In a further implementation form of the first aspect, a length of the first time period is in the range 12 hours to 10 days. The method may enable, for example, reliability assessment of the EV charging station during recent history by using the first reliability index.

In a further implementation form of the first aspect, a length of the second time period is in the range 30 days to 12 months. The method may enable, for example, reliability assessment of the EV charging station during less recent history by using the second reliability index.

In a further implementation form of the first aspect, the calculating the first/second reliability index based on the history information comprises: assigning points to at least one reliability indicator based on the history information; and calculating the first/second reliability index based on the assigned points. The method may enable, for example, reliability assessment of the EV charging station by taking into account various factors.

In a further implementation form of the first aspect, the at least one reliability indicator comprises at least one of: offline time percentage of the EV charging station; fault time percentage of the EV charging station; number of warnings transmitted by the EV charging station; number of charges performed using the EV charging station shorter than a preconfigured minimum time threshold; number of charges performed using the EV charging station longer than a preconfigured maximum time threshold; number of charges performed using the EV charging station with charged energy less than a preconfigured energy threshold; number of failed charges performed using the EV charging station; or number of successful charges performed using the EV charging station. The method may enable, for example, reliability assessment of the EV charging station by taking into account various factors that may reflect the reliably of the EV charging station.

It is to be understood that the implementation forms of the first aspect described above may be used in combination with each other. Several of the implementation forms may be combined together to form a further implementation form.

According to a second aspect, a computer program product is provided, comprising program code configured to perform a method according to the first aspect when the computer program is executed on a computer.

According to a third aspect, a computing device is configured to: obtain a history information of an electric vehicle, EV, charging station; calculate a first reliability index based on the history information, wherein the first reliability index corresponds to reliability of the EV charging station during a first time period; calculate a second reliability index based on the history information, wherein the second reliability index corresponds to reliability of the EV charging station during a second time period; and calculate a third reliability index based on the first reliability index and the second reliability index. With such configurations, the computing device can, for example, assess reliably of the EV charging station.

In an implementation form of the third aspect, a length of the first time period is shorter than a length off the second time period. With such configurations, the computing device can, for example, assess reliably of the EV charging station by assessing short term reliability of the EV charging station using the first reliability index and by assessing long term reliability of the EV charging station using the second reliability index. These can then be combined into the third reliability index in order to assess total reliability of the EV charging station.

In a further implementation form of the third aspect, a length of the first time period is in the range 12 hours to 10 days. The method may enable, for example, reliability assessment of the EV charging station during recent history by using the first reliability index.

In a further implementation form of the third aspect, a length of the second time period is in the range 30 days to 12 months. With such configurations, the computing device can, for example, assessment the reliability of the EV charging station during less recent history by using the second reliability index.

In a further implementation form of the third aspect, the computing device is configured to calculate the first/second reliability index based on the history information by performing: assign points to at least one reliability indicator based on the history information; and calculate the first/second reliability index based on the assigned points. With such configurations, the computing device can, for example, assess the reliability of the EV charging station by taking into account various factors.

In a further implementation form of the third aspect, the at least one reliability indicator comprises at least one of: offline time percentage of the EV charging station; fault time percentage of the EV charging station; number of warnings transmitted by the EV charging station; number of charges performed using the EV charging station shorter than a preconfigured minimum time threshold; number of charges performed using the EV charging station longer than a preconfigured maximum time threshold; number of charges performed using the EV charging station with charged energy less than a preconfigured energy threshold; number of failed charges performed using the EV charging station; or number of successful charges performed using the EV charging station. With such configurations, the computing device can, for example, assess the reliability of the EV charging station by taking into account various factors that may reflect the reliably of the EV charging station.

In a further implementation form of the third aspect, the first time period corresponds to a time period between a current time and a first time threshold. The computing device may be able to, for example, assess reliability of the EV charging station during recent history by using the first reliability index.

In a further implementation form of the third aspect, the second time period corresponds to a time period between the first time threshold and a second time threshold. The computing device may be able to, for example, assess reliability of the EV charging station during less recent history by using the second reliability index.

It is to be understood that the implementation forms of the third aspect described above may be used in combination with each other. Several of the implementation forms may be combined together to form a further implementation form.

Many of the attendant features will be more readily appreciated as they become better understood by reference to the following detailed description considered in connection with the accompanying drawings.

DESCRIPTION OF THE DRAWINGS

In the following, example embodiments are described in more detail with reference to the attached figures and drawings, in which.

In the following, like reference numerals are used to designate like parts in the accompanying drawings.

DETAILED DESCRIPTION

In the following description, reference is made to the accompanying drawings, which form part of the disclosure, and in which are shown, by way of illustration, specific aspects in which the present disclosure may be placed. It is understood that other aspects may be utilized and structural or logical changes may be made without departing from the scope of the present disclosure. The following detailed description, therefore, is not to be taken in a limiting sense, as the scope of the present disclosure is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various example aspects described herein may be combined with each other, unless specifically noted otherwise.

Figure 1:
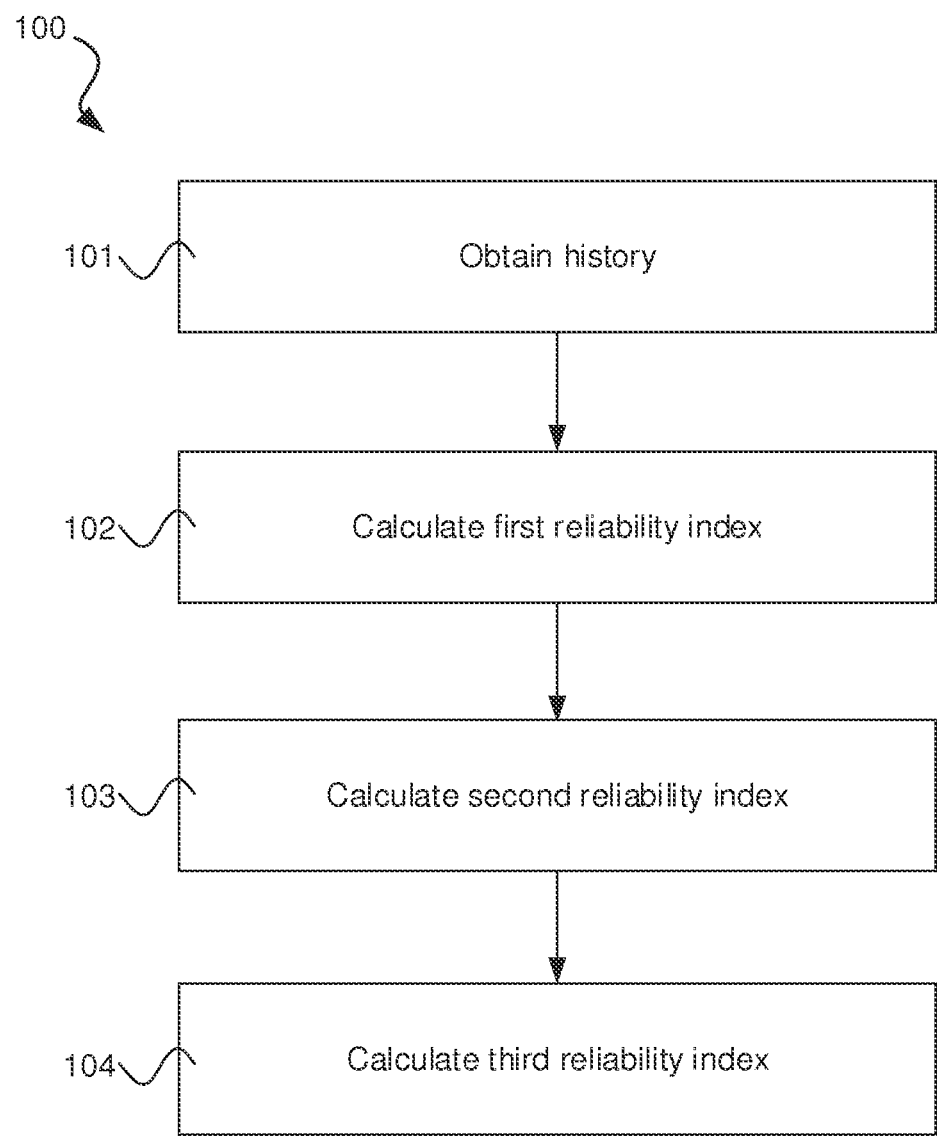
FIG. 1 illustrates a flow chart representation of a method for charging station reliability assessment according to an embodiment.

FIG. 1 illustrates a flow chart representation of a method 100 for electric vehicle (EV) charging station reliability assessment according to an embodiment.

According to an embodiment, the method 100 comprises obtaining 101 a history information of an electric vehicle, EV, charging station.

The history information may comprise any information related to the usage of the EV charging station. The history information may also be referred to as history, log, log information, or similar. The history information may, for example, comprise a log of each charging event of the EV charging station. The log may further comprise the length of each charging session, energy amount charged during a charging session, information about failed charging sessions, messages, such as error messages, transmitted by the EV charging station, any errors occurred, and/or time periods when the EV charging station has been out of order.

The obtaining 101 may be performed by, for example, a computing device that is coupled to the EV charging station via a telecommunication network/link. Such a computing device may, for example, gather history information by communicating with a plurality of EV charging stations. Each EV charging station may comprise a computing device that may be configured to gather data, such as usage data, about the EV charging station.

An EV charging station may refer to a device that may be used to charge an EV, such as an electric car. An EV charging network may refer to a network of EV charging stations. Each EV charging stations in the EV charging network may, for example, be connected to a computing device, such as a server, via a telecommunication network or similar. The EV charging stations in the EV charging network may be, for example, monitored and/or administered using the computing device.

The method 100 may further comprise calculating 102 a first reliability index based on the history information, wherein the first reliability index corresponds to reliability of the EV charging station during a first time period.

The first reliability index may also be referred to as a first reliability value or similar. The first reliability index may quantify how reliable the EV charging station has been during the first time period. A greater value may indicate that the EV charging station has been more reliable and a smaller value may indicate that the EV charging station has been less reliable or vice versa.

The first time period may also be referred to as a first period of time, first time interval, or similar. The first time period may correspond to a time period of any length.

The first reliability index may be calculated, by, for example, choosing events that have occurred during the first time period from the history information. For example, a first subset may be selected from the history information. The first subset may correspond to the first time interval. The first reliability index may be calculated based on the first subset.

The method may further comprise calculating 103 a second reliability index based on the history information, wherein the second reliability index corresponds to reliability of the EV charging station during a second time period.

The second reliability index may also be referred to as a second reliability value or similar. The second reliability index may quantify how reliable the EV charging station has been during the second time period. A greater value may indicate that the EV charging station has been more reliable and a smaller value may indicate that the EV charging station has been less reliable or vice versa.

The second reliability index may be calculated, by, for example, choosing events that have occurred during the second time period from the history information. For example, a second subset may be selected from the history information. The second subset may correspond to the second time interval. The second reliability index may be calculated based on the second subset.

The second time period may also be referred to as a second period of time, second time interval, or similar. The second time period may correspond to a time period of any length. The second time period may be a different time period from the first time period. The length of the second time period may be greater that the length of the first time period.

The calculating 102 the first reliability index and the calculating the second reliability index 103 may be performed in any order or substantially concurrently.

The method 100 may further comprise calculating 104 a third reliability index based on the first reliability index and the second reliability index.

The third reliability index may also be referred to as a third reliability value, a total reliability index, a total reliability value, reliability index, or similar. The third reliability index may quantify how reliable the EV charging station has been during the first time period and the second time period.

The third reliability index may be calculated, for example, as an average of the first reliability index and the second reliability index. The average may be, for example, an arithmetic mean, a geometric mean, a weighted mean, a quadratic mean, or similar. For example, if the first reliability index corresponds to more recent reliability of the EV charging station, it may be beneficial to weight the first reliability index more when calculating the third reliability index so that the third reliability index reflects more the current condition of the EV charging station.

The first/second reliability index can combine many different information sources and indirect indicators of possible problems. These can then be combined into a single index, the third reliability index, that can indicate to users how well they can trust that the station they are planning to use will be functional.

The first reliability index may correspond to the current status of the EV charging station. The second reliability index may correspond to the reliability history of the EV charging station. Length of the first time period may be smaller than length of the second time period.

According to an embodiment, a length of the first time period is in the range 12 hours to 10 days. The length of the first time period may be in any subrange of this, such as 12 hours to 48 hours, 12 hours to 5 days, or 24 hours to 4 days.

According to an embodiment, a length of the second time period is in the range 30 days to 12 months. The length of the second time period may be in any subrange of this, such as 30 days to 90 days, 60 days to 120 days, or 30 days to 6 months.

The current status can indicate how well the EV charging station has been functioning during, for example, the last 24 hours. This may be useful mainly because even if an EV charging station might have been working well in the past, it might have started malfunctioning today and therefore customers cannot trust that the EV charging station will be functional today. Or on the other hand, the EV charging station may have had a lot of issues in the history but the issues may have been fixed, and today the station may be functioning properly.

The reliability history may indicate how well the EV charging station has been functioning in, for example, the last 4 months. This may be a useful reliability indicator for the customers to know if they can trust that the station is functioning correctly. Even if there has not been any problems today, if the reliability history is poor, it may be quite likely that there could be problems again today.

Figure 2:
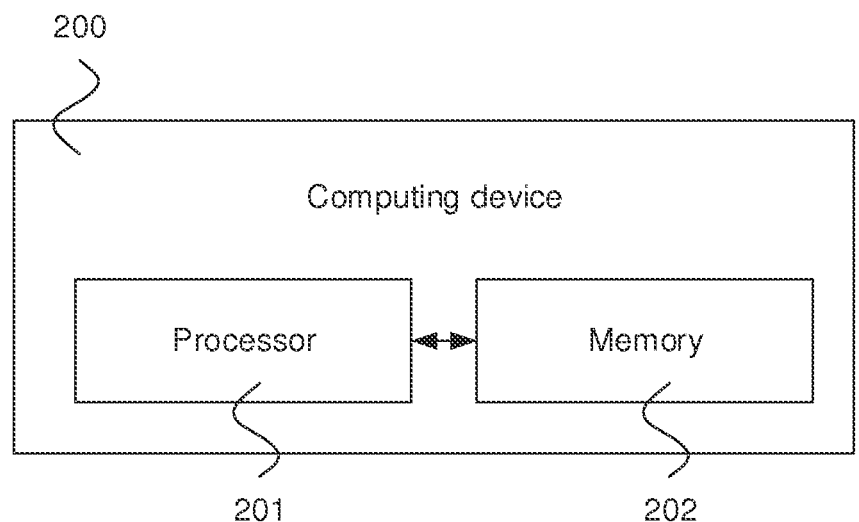
FIG. 2 illustrates a schematic representation of a computing device for electric vehicle charging station reliability assessment according to an embodiment.

FIG. 2 illustrates a schematic representation of the computing device 200 according to an embodiment.

The computing device 200 may comprise at least one processor 201. The at least one processor 201 may comprise, for example, one or more of various processing devices, such as a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The computing device 200 may further comprise a memory 202. The memory 202 may be configured to store, for example, computer programs and the like. The memory 202 may comprise one or more volatile memory devices, one or more non-volatile memory devices, and/or a combination of one or more volatile memory devices and non-volatile memory devices. For example, the memory 202 may be embodied as magnetic storage devices (such as hard disk drives, floppy disks, magnetic tapes, etc.), optical magnetic storage devices, and semiconductor memories (such as mask ROM, PROM (programmable ROM), EPROM (erasable PROM), flash ROM, RAM (random access memory), etc.).

When the computing device 200 is configured to implement some functionality, some component and/or components of the computing device 200, such as the at least one processor 201 and/or the memory 202, may be configured to implement this functionality. Furthermore, when the at least one processor 201 is configured to implement some functionality, this functionality may be implemented using program code comprised, for example, in the memory 202. For example, if the computing device 200 is configured to perform an operation, the at least one memory 202 and the computer program code can be configured to, with the at least one processor 201, cause the computing device 200 to perform that operation.

According to an embodiment, the computing device 200 is configured to obtain a history information of an electric vehicle, EV, charging station.

The computing device 200 may further be configured to calculate a first reliability index based on the history information, wherein the first reliability index corresponds to reliability of the EV charging station during a first time period.

The computing device 200 may further be configured to calculate a second reliability index based on the history information, wherein the second reliability index corresponds to reliability of the EV charging station during a second time period.

The computing device 200 may be configured to calculate the first reliability index and the second reliability index in any order or substantially concurrently.

The computing device 200 may further be configured to calculate a third reliability index based on the first reliability index and the second reliability index.

Figure 3:
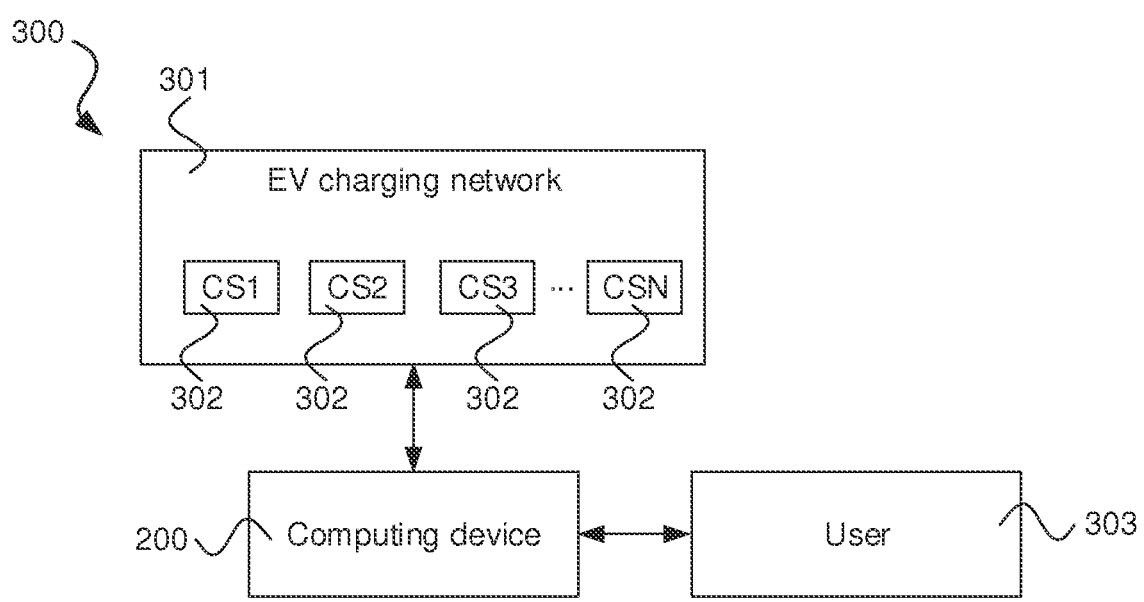
FIG. 3 illustrates a schematic representation of an electric vehicle charging system according to an embodiment.

FIG. 3 illustrates a schematic representation of a system 300 for EV charging station reliability assessment according to an embodiment.

The system 300 may comprise an EV charging network 301, a computing device 200, and/or a user 303. The EV charging network 301 may comprise a plurality of EV charging stations 302.

The computing device 200 may communicate with the EV charging network 301 using, for example, a data connection. The data connection may be any connection that enables the computing device 200 to communicate with the EV charging network 301. The data connection may comprise, for example, internet, Ethernet, 3G, 4G, long-term evolution (LTE), new radio (NR), Wi-Fi, or any other wired or wireless connections or some combination of these. For example, the data connection may comprise a wireless connection, such as Wi-Fi, an internet convection, and an Ethernet connection.

The computing device 200 may be implemented as a part of a backend system. The backend system may comprise, for example, a plurality of servers and the computing device 200 may correspond to one or more of those servers. The backend system may be configured to monitor and/or administer the EV charging network 301 and/or the EV charging stations 302.

The computing device 200 may be configured to obtain history information from the EV charging network 301. The computing device may be configured to obtain history information from one or more EV charging station 302.

A user 303 may interact with the computing device 200. The interaction may be direct via, for example, a user interface, or indirect. The user 303 may be, for example, an end customer. The user 303 may, for example, send a query to the computing device 200 using a mobile device, such as a mobile phone. In the query, the user 303 may request for the reliability index of one or more EV charging stations. The computing device 200 may calculate the reliability indexes in response to the query or the computing device 200 may have calculated the reliability indexes in advance. The computing device 200 may then transmit the requested reliability indexes to the user 303. After receiving the reliability indexes, the user 303 may choose which EV charging station they are going to use.

For end customers typical way to communicate about the reliability is mobile applications or web-based applications where the user 303 can view the status of different EV charging stations. When a user 303 opens information about an EV charging station from a mobile application, there can be a simple traffic light view about the reliability of the EV charging station. For example, if the reliability index is in the range 0-100, red colour may indicate 0-33 points, yellow colour may indicate 34-66 points, and green colour may indicate 67-100 points. This can indicate to the user 303 the reliability index of the EV charging station in a simplified format.

Alternatively, the user 303 may be a charging station owner/administrator. The computing device 200 may send a more comprehensive report to such user. Such a report can be sent, for example, automatically by email or seen in a web-based administration portal. The EV charging station owner report may show a summary of all the EV charging station of that owner, for example using the aforementioned on traffic light representation, and/or per station details. For example, the report may indicate the lowest scoring factors in the history information. The user 303 can then use this more detailed information to see which of their EV charging stations are working poorly and which might need maintenance or replacement.

The method 100 may further comprise providing the third reliability index to a user 303. The providing may comprise, for example, transmitting the third reliability index to the user 303.

The computing device 200 may further be configured to provide the third reliability index to a user 303. The computing device 200 may be configured to, for example, transmit the third reliability index to the user 303.

Alternatively or additionally, the computing device 200 may be configured to calculate the first/second/third reliability index without any input form a user 303. The computing device 200 may, for example, compile statistic about the reliability indexes of a plurality of EV charging stations 302. An administrator may then use the statistics to deduce if, for example, some particular model of an EV charging station in not suitable for particular application/conditions based on the reliability indexes.

Figure 4:
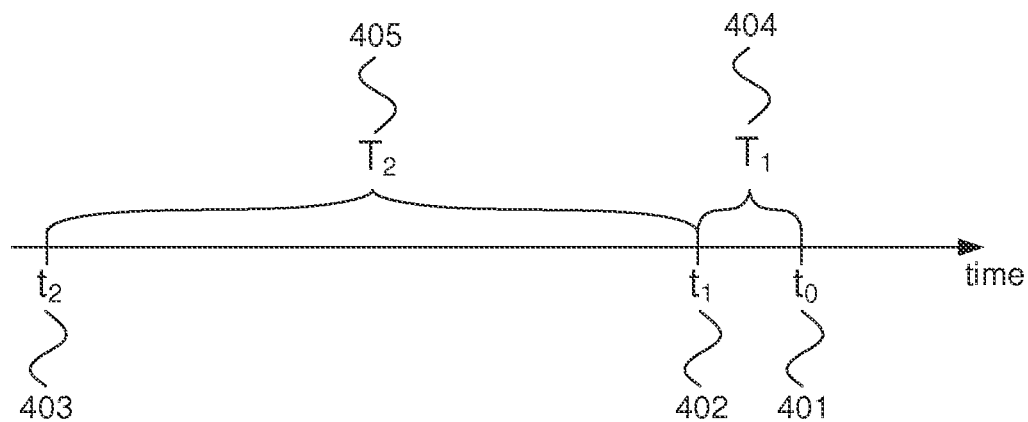
FIG. 4 illustrates a schematic representation of a timeline according to an embodiment.

FIG. 4 illustrates a schematic representation of a timeline according to an embodiment. Three time instants, a current time $t_0$ 401, a first time threshold $t_1$ 402, and a second time threshold $t_2$ 403, are illustrated in the embodiment of FIG. 4. The current time $t_0$ 401, the first time threshold $t_1$ 402, and the second time threshold $t_2$ 403 may also be referred to as time instants. Two time periods, a first time period $T_1$ 404 and a second time period $T_2$ 405 are also illustrated in the embodiment of FIG. 4. The time instants 401-403 and the time periods 404, 405 presented in the embodiment of FIG. 4 are only illustrative.

The first reliability index may corresponds to reliability of the EV charging station during the first time period $T_1$ 404. The second reliability index may corresponds to reliability of the EV charging station during the second time period $T_2$ 405.

According to an embodiment, the first time period $T_1$ 404 is shorter than the second time period $T_2$ 405.

Additionally or alternatively, the first time period $T_1$ 404 and the second time period $T_2$ 405 may be contiguous. For example, when the second time period $T_2$ 405 ends, the first time period $T_1$ 404 may start. In the embodiment of FIG. 4, for example, the second time period $T_2$ 405 may end at the first time threshold $t_1$ 402 and the first time period $T_1$ 404 may start at the first time threshold $t_1$ 402.

Additionally or alternatively, the first time period $T_1$ 404 may correspond to a time period between a current time $t_0$ 401 and a first time threshold $t_1$ 402. Current time $t_0$ 401 may refer to a moment of time when the method 100 is performed and/or when the computing device 200 performs the operations disclosed herein. As a person skilled in the art can appreciate, although performing the operations and/or the method 100 may take some period of time, the length of such a period may be considered insignificant.

Additionally or alternatively, the second time period $T_2$ 405 may correspond to a time period between the first time threshold $t_1$ 402 and a second time threshold $t_2$ 403. The length of the first time period $T_1$ 404 may be in any subrange of this, such as 12 hours to 48 hours, 12 hours to 5 days, or 24 hours to 4 days.

Additionally or alternatively, a length of the second time period $T_2$ 405 may be in the range 30 days to 12 months. The length of the second time period $T_2$ 405 may be in any subrange of this, such as 30 days to 90 days, 60 days to 120 days, or 30 days to 6 months.

Figure 5:
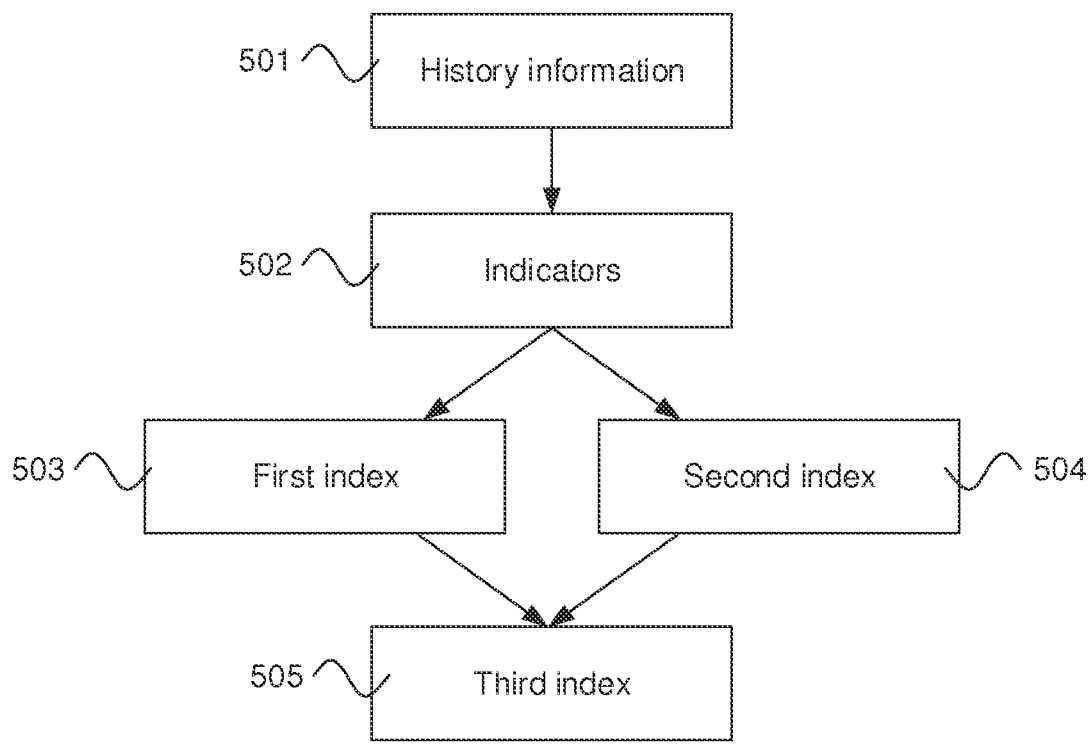
FIG. 5 illustrates a schematic representation of data used for electric vehicle charging station reliability assessment according to an embodiment.

FIG. 5 illustrates a schematic representation of data used for EV charging station reliability assessment according to an embodiment.

Based on history information 501, points can be assigned for various reliability indicators 502. The reliability indicators 502 may comprise, for example, one or more of the reliability indicators described herein.

Assigning points to the reliability indicators may comprise, for example, calculating a value for a reliability indicator and assigning points based on the value of the reliability indicator. For example, calculating a value for a reliability indicator may comprise calculating, based on the history information, that a certain EV charging station has been faulty for 10% of the first time interval 404. Then, some number of points may be assigned to the reliability indicator "faulty time percentage" based on the 10% value. The number of assigned points may be, for example, greater the less time the EV charging station has been faulty. Further examples of reliability indicators and points assigned to reliability indicators are disclosed herein.

The points can be assigned for the reliability indicators separately for the first time interval 404 and the second time interval 405. For example, points may be assigned for each reliability indicator for the first time interval 404 by choosing data from the history information 501 that corresponds to the first time interval 404. Data that correspond to the first time interval 404 may comprise, for example, events, such as charging sessions, that have occurred during the first time interval 404. Correspondingly, points may be assigned for each reliability indicator for the second time interval 405 by choosing data from the history information 501 that corresponds to the second time interval 405.

Based on the points assigned to the reliability indicators 502, a first reliability index 503 can be calculated. If the points have been assigned to the reliability indicators 502 separately for the first time interval 404 and for the second time interval 405, the first reliability index 503 may be calculated based on the points assigned to the reliability indicators for the first time interval 404.

Based on the points assigned to reliability indicators 502, a second reliability index 504 can be calculated. If the points have been assigned to the reliability indicators 502 separately for the first time interval and the second time interval, the second reliability index 504 may be calculated based on the points assigned to the reliability indicators for the second time interval.

Based on the first reliability index 503 and the second reliability index 504, a third index 505 can be calculated.

Each reliability indicator may indicate how well or poorly the EV charging station 302 has been functioning. The maximum number of assigned points for all reliability indicators may be, for example, 100, and the minimum number of points may be 0. For example, 10 points may be available to be assigned to reliability indicator 1, 50 points may be available to be assigned to reliability indicator 2, and 40 points may be available to be assigned to reliability indicator 3. The total number of reliability indicators used and the number of points available to be assigned may vary.

Each reliability indicator may be a direct reliability indicator or an indirect reliability indicator.

In the following, some reliability indicators are disclosed that can be used to assign points to an EV charging station 302. These are only example reliability indicators and additionally or alternatively other reliability indicators may also be used.

The at least one reliability indicator may comprise offline time percentage of the EV charging station.

Offline time percentage may refer to the percentage that the EV charging station has been offline during the relevant time interval. Herein, the relevant time interval may comprise, for example, the first time interval 404 or the second time interval 405. The offline time percentage $p_{offline\ time}$ may be calculated by dividing the total time the EV charging station 302 has been offline during the relevant time interval $t_{offline}$ by the total length of the relevant time interval $t_{period}$:

$$p_{offline\ time} = \frac{t_{offline}}{t_{period}}.$$

For example, if the length of the relevant time interval is $t_{period}$=24 h=1440 min, and during that time interval the EV charging station 302 has been offline for $t_{offline}$=27 min, then offline time percentage would be 27/1440=1.9%.

The number of points $P_{offline\ time}$ assigned for the offline time percentage $p_{offline\ time}$ may be calculated using, for example, $$P_{offline\ time} = \begin{cases} 15 \times (1 - 50 \times p_{offline\ time}), & 0 \le p_{offline\ time} \le 0.02 \\ 0, & p_{offline\ time} > 0.02 \end{cases}.$$

For example, with 1% offline time percentage the number of points would be $15\times(1-50\times0.01)=15\times0.5=7.5$ points.

Alternatively or additionally, the at least one reliability indicator may comprise fault time percentage of the EV charging station.

Fault time percentage may refer to the percentage that the EV charging station 302 has been in a faulted state during the relevant time interval. Faulted may mean that the EV charging station 302 is online, but it has reported a fault and therefore the EV charging station 302 cannot be used. The fault time percentage $p_{fault\ time}$ may be calculated by dividing the total time the EV charging station 302 has been faulted during the relevant time interval $t_{fault\ time}$ by the total length of the relevant time interval $t_{period}$:

$$p_{fault\ time} = \frac{t_{fault\ time}}{t_{period}}.$$

For example, if the length of the relevant time interval is $t_{period}=24\ h=1440\ min$, and during that time interval the EV charging station 302 has been faulted for $t_{offline}=29\ min$, the offline time percentage would be $29/1440=2.0\%$.

The number of points $P_{fault\ time}$ assigned for the fault time percentage $p_{fault\ time}$ may be calculated using, for example, $$P_{fault\ time} = \begin{cases} 15 \times (1 - 50 \times p_{fault\ time}), & 0 \le p_{fault\ time} \le 0.02 \\ 0, & p_{fault\ time} > 0.02 \end{cases}$$

For example, with 1% fault time percentage the number of points would be $15\times(1-50\times0.01)=15*0.5=7.5$ points.

The offline time percentage and the fault time percentage may be referred to as direct reliability indicators, since these can directly indicate a fault in the EV charging station.

Alternatively or additionally, the at least one reliability indicator may comprise number of warnings transmitted by the EV charging station.

Warnings may refer to different messages that EV charging stations 302 transmit to the backend system. Warnings may indicate that something is not normal in the EV charging station 302, but the station can still be used. Typical warning may include, for example, a weak wireless signal or too high of a temperature. The number of warnings $p_{warnings}$ can be calculated as an average number of warnings per hour. For example, if station had sent 10 warnings during the last 24 hours, then average number of warnings would be $p_{warnings}=0.42$ warnings/hour.

The number of points $P_{warnings}$ assigned for the number of warnings $p_{warnings}$ may be calculated using, for example, $$P_{warnings} = \begin{cases} 10, & p_{warnings} < 0.13 \\ 10 \times (0.43 - p_{warning})/0.3, & 0.13 \le p_{warnigs} \le 0.43 \\ 0, & p_{warnings} > 0.43 \end{cases}$$

For example, if the average number of warnings per hour was 0.28, then the number of points would be $10\times(0.43-0.28)/0.30=10\times0.15/0.30=5$ points.

Alternatively or additionally, the at least one reliability indicator may comprise number of charges performed using the EV charging station shorter than a preconfigured minimum time threshold.

Short charges may refer to events where charging starts, but then ends before it has lasted longer than a preconfigured minimum time threshold.

The minimum time threshold may be in the range 10 second to 5 minutes. The minimum time threshold may be in any subrange of this, such as 10 seconds to 2 minutes, 1 minute to 3 minutes, or 5 seconds to 4 minutes. The minimum time threshold may be, for example, 30 seconds, 1 minute, 2 minutes, or 5 minutes.

Short charges can indicate that the EV is not able to charge as planned with the EV charging station 302. The number of short charges $p_{short}$ can be calculated as the average number of short chargers per hour. For example, if an EV charging station 302 had 1 short charge during the last 24 hours, then average would be 0.042 charges/hour.

The number of points $P_{short}$ assigned for the number of short charges $p_{short}$ may be calculated using, for example, $$P_{short} = \begin{cases} 15, & p_{short} < 0.04 \\ 15 \times (0.16 - p_{short})/0.12, & 0.04 \le p_{short} \le 0.16 \\ 0, & p_{short} > 0.16 \end{cases}$$

For example, if the average number of short charges per hour was 0.10, then the number of points would be $15\times(0.16-0.10)/0.12=15\times0.06/0.12=7.5$ points.

Alternatively or additionally, the at least one reliability indicator may comprise number of charges performed using the EV charging station with charged energy less than a preconfigured energy threshold.

Charges with less energy than a preconfigured energy threshold usually indicate situations where charging starts, and may even last for several hours, but for some reason the EV does not receive significant amounts of energy from the charging.

The preconfigured energy threshold may be in the range 10 watthours to 200 watthours or in any subrange of this, such as 20 watthours to 150 watthours, 50 watthours to 200 watthours or 70 watthours to 130 watthours. The preconfigured energy threshold may be, for example, 100 watthours.

If a charging event is also short (see previous reliability indicator above) the charging energy is usually also less than the preconfigured energy threshold. In such a case, only the short charging may be considered in the reliability indicator for this event, and the low energy reliability indicator may be ignored for that individual charging event. The number of charges with low energy can be calculated using an average number of low energy charges per hour. For example, if a charging station had 1 charge with less energy than the preconfigured energy threshold during the last 24 hours, then the average would be 0.042 charges/hour.

The number of points $P_{energy}$ assigned for the number of low-energy charges $p_{energy}$ may be calculated using, for example, $$P_{energy} = \begin{cases} 10, & p_{energy} < 0.04 \\ 10 \times (0.16 - p_{energy})/0.12, & 0.04 \le p_{energy} \le 0.16 \\ 0, & p_{energy} > 0.16 \end{cases}$$

For example, if the average number of low-energy charges per hour was 0.10, then the number of points would be 10×(0.16−0.10)/0.12=10×0.06/0.12=5 points.

Alternatively or additionally, the at least one reliability indicator may comprise number of charges performed using the EV charging station longer than a preconfigured maximum time threshold.

A long charge may be a charge that lasts more than a preconfigured maximum time threshold. The preconfigured maximum time threshold may be, for example, in the range 6 hours (h) to 48 h or in any subrange of this, such as 12 h to 36 h, 6 h to 36 h or 18 h to 32 h. The maximum time threshold may be, for example, 24 h. Also a charge that has not yet ended but was originally started more than the preconfigure maximum time threshold ago, may be considered a long charge.

Long charge can indicate that the EV charging station 302 fails to report that charging has ended. In many situations, an EV has stopped charging already several hours ago, but the EV charging station 302 has not reported this stop event to the backend system. Therefore, the backend system still is under the impression that charging is in progress.

The number of long charges may be calculated as the average number of long chargers per hour. For example, if a charging station had 5 long charges during the last 30 days, then average would be approximately 0.0069 charges/hour.

The number of points $P_{long}$ assigned for the number of long charges $p_{long}$ may be calculated using, for example, $$P_{long} = \begin{cases} 5, & p_{long} < 0.0042 \\ 5 \times (0.0092 - p_{long})/0.005, & 0.0042 \leq p_{long} \leq 0.0092 \\ 0, & p_{long} > 0.0092 \end{cases}$$

For example, if average number of long charges per hour was 0.0067, then the number of points would be 5×(0.0092−0.0067)/0.005=5×0.0025/0.0050=2.5 points.

Alternatively or additionally, the at least one reliability indicator may comprise number of failed charges performed using the EV charging station.

A failed charge may correspond to a situation where an EV charging station 302 seems to be online and functioning property, and a user tries to start charging using the EV charging station 302, but charging does not start. A typical cause can be, for example, that there is some technical issues with the EV charging station 302 and the station does not accept or handle at all the start-command sent to the EV charging station 302.

Failed charges are typically an indicator that there is some unknown issue with the EV charging station 302 that the station is not normally reporting to the backend system in normal fault/warning messages. Failed charges can also be an indicator of telecom issues, like a firewall blocking some commands or similar.

Failed charges may be calculated as the average number of failed chargers per hour. For example, if station had 1 failed charge during the last 24 hours, then the average number of failed charges would be 0.042 charges/hour.

The number of points $P_{failed}$ assigned for the number of failed charges $p_{failed}$ may be calculated using, for example, $$P_{failed} = \begin{cases} 10, & p_{failed} < 0.04 \\ 10 \times (0.2 - p_{failed})/0.16, & 0.04 \leq p_{failed} \leq 0.2 \\ 0, & p_{failed} > 0.2 \end{cases}$$

For example, if the average number of warnings per hour was 0.12, then the number of points would be 10×(0.20−0.12)/0.16=10×0.08/0.16=5 points.

Alternatively or additionally, the at least one reliability indicator may comprise number of successful charges performed using the EV charging station.

Successful charges may be positive indicators that many users have been able to charge on an EV charging station. Even if there were no problems (so full points from the previous indicators), it should not be assumed that the EV charging station 302 is fully functional. For example, it is possible that there is obstruction, such as a pile of snow, in front of the EV charging station 302, and users are therefore unable to use the EV charging station 302. The station itself may be functioning correctly, but users still cannot charge using the EV charging station 302 because the charging station is inaccessible. However, if people have been charging on a station consistently, it may be assumed that the EV charging station 302 is functioning without any issues.

A charge may be considered to be successful if it has started and ended, the charge lasted between the preconfigured minimum time threshold and the preconfigured maximum time threshold, and more than the preconfigured energy threshold was charged. The preconfigured minimum time threshold may comprise any number disclosed herein. The preconfigured maximum time threshold may comprise any number disclosed herein. The preconfigured energy threshold may comprise any number disclosed herein.

The number of successful charges can be calculated as an average number of successful charges per hour. For example, if there were 10 successful charges during 24 h, there would be approximately 0.42 successful charges/hour on average.

The number of points $P_{success}$ assigned for the number of successful charges $p_{success}$ may be calculated using, for example, $$P_{success} = \begin{cases} 20 \times p_{success}/0.21, & 0 \leq p_{success} \leq 0.21 \\ 20, & p_{success} > 0.21 \end{cases}$$

For example, if the average number of successful charges per hour was 0.105, the number of points would be 20×$p_{success}$/0.21=30×0.105/0.21=15 points.

The values disclosed in the examples above are only exemplary and may be adjusted for different applications and situations.

The number of warnings transmitted by the EV charging station, the number of charges performed using the EV charging station shorter than the preconfigure minimum time threshold, number of charges performed using the EV charging station with charged energy less than the preconfigured energy threshold, the number of charges performed using the EV charging station longer than a preconfigured maximum time threshold, the number of failed charges performed using the EV charging station, and/or the number of successful charges performed using the EV charging station may be referred to as indirect reliability indicators.

The first reliability index and/or the second reliability index can be calculated by, for example, summing all the points assigned to the at least one reliability indicator. If the total number of assigned points is limited to, for example, 100 points, the maximum value of the first/second reliability index is then 100 points.

The reliability index, such as the third reliability index 505, can be calibrated based on user feedback and experience about the EV charging station. Calibration can affect the points available to be assigned for each reliability indicator. Calibration can be done by, for example, gathering user feedback (helpdesk calls, support request through web forms, social media messages etc.) from different EV charging stations. The feedback can be manually gathered together for example once a month, and based on the feedback, a user feedback index can be created. The user feedback index may indicate how much negative feedback different EV charging stations receive from users. The customer feedback index can then be compared with reliability index in order to compare if the results match.

As an example, if the worst performing EV charging station receives 50 negative customer feedbacks each month, and the second worst performing EV charging station receives 40 negative feedbacks, those two EV charging stations should also receive low reliability indexes. If this is not the case, the reliability index can be calibrated by testing different amounts of points available to be assigned for each reliability indicator and by checking if the reliability indexes match better with the user feedback after the adjustment. This may be repeated in an iterative manner until the reliability indexes better match the user feedback.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method, comprising:
receiving, by a computing device and from a mobile device application, a query requesting one or more reliability indexes corresponding to reliability of one or more electric vehicle (EV) charging stations;
in response to the query, obtaining, by the computing device and using a telecommunications link, a history information of an EV charging station of the one or more EV charging stations;
calculating, by the computing device, a first reliability index based on the history information, wherein the first reliability index corresponds to reliability of the EV charging station during a first time period;
calculating, by the computing device, a second reliability index based on the history information, wherein the second reliability index corresponds to reliability of the EV charging station during a second time period;
calculating, by the computing device, a third reliability index based on the first reliability index and the second reliability index; and
providing, by the computing device and using the telecommunications link, the third reliability index to the mobile device application;
wherein the calculating the first/second reliability index based on the history information comprises:
assigning points to at least one reliability indicator based on the history information; and
calculating the first/second reliability index based on the assigned points;
wherein the at least one reliability indicator comprises at least a number of charges performed using the EV charging station shorter than a preconfigured minimum time threshold.

2. The method according to claim 1, wherein a length of the first time period is shorter than a length of the second time period.

3. The method according to claim 1, wherein the first time period corresponds to a time period between a current time and a first time threshold.

4. The method according to claim 1, wherein the second time period corresponds to a time period between the first time threshold and a second time threshold.

5. The method according to claim 1, wherein a length of the first time period is in the range 12 hours to 10 days.

6. The method according to claim 1, wherein a length of the second time period is in the range 30 days to 12 months.

7. The method according to claim 1, wherein the at least one reliability indicator further comprises at least one of:
offline time percentage of the EV charging station;
fault time percentage of the EV charging station;
number of warnings transmitted by the EV charging station;
number of charges performed using the EV charging station longer than a preconfigured maximum time threshold;
number of charges performed using the EV charging station with charged energy less than a preconfigured energy threshold;
number of failed charges performed using the EV charging station; or
number of successful charges performed using the EV charging station.

8. A computer program product comprising program code configured to perform the method according to claim 1 when the computer program product is executed on a computer.

9. A computing device, configured to:
receive, from a mobile device application, a query requesting one or more reliability indexes corresponding to reliability of one or more electric vehicle (EV) charging stations;
in response to the query, obtain, using a telecommunications link, a history information of an EV charging station;
calculate a first reliability index based on the history information, wherein the first reliability index corresponds to reliability of the EV charging station during a first time period;
calculate a second reliability index based on the history information, wherein the second reliability index corresponds to reliability of the EV charging station during a second time period;
calculate a third reliability index based on the first reliability index and the second reliability index; and
provide, using the telecommunications link, the third reliability index to the mobile device application;
wherein the computing device is configured to calculate the first/second reliability index based on the history information by performing:
assign points to at least one reliability indicator based on the history information; and
calculate the first/second reliability index based on the assigned points;
wherein the at least one reliability indicator comprises at least a number of charges performed using the EV charging station shorter than a preconfigured minimum time threshold.

10. The computing device according to claim 9, wherein a length of the first time period is shorter than a length of the second time period.

11. The computing device according to claim 9, wherein a length of the first time period is in the range 12 hours to 10 days.

12. The computing device according to claim 9, wherein a length of the second time period is in the range 30 days to 12 months.

13. The computing device according to claim 9, wherein the at least one reliability indicator comprises at least one of:
offline time percentage of the EV charging station;
fault time percentage of the EV charging station;
number of warnings transmitted by the EV charging station;
number of charges performed using the EV charging station longer than a preconfigured maximum time threshold;
number of charges performed using the EV charging station with charged energy less than a pre-configured energy threshold;
number of failed charges performed using the EV charging station; or
number of successful charges performed using the EV charging station.

14. The method according to claim 1, further comprising:
obtaining, by the computing device and using the telecommunications link, second history information of a second EV charging station of the one or more EV charging stations;
determining, by the computing device, a fourth reliability index corresponding to the second EV charging station;
generating, by the computing device, a first reliability index display item corresponding to the third reliability index;
generating, by the computing device, a second reliability index display item corresponding to the fourth reliability index; and
causing, by the computing device, the first reliability index display item and the second reliability index display item to be rendered on an interface associated with the mobile device application.

15. The method according to claim 1, wherein the EV charging station is associated with a first model type.

16. The method according to claim 15, further comprising:
determining, by the computing device, that the first model type is not acceptable for a first application based on the third reliability index.

17. The method according to claim 1, further comprising:
identifying, by the computing device and via the telecommunications link, a warning associated with the EV charging station, wherein the warning is indicative of a weak wireless signal or a high temperature.

* * * * *